3,307,934
METHOD OF MAKING A GRANULATED
PEAT FERTILIZER
Robert Wilson Palmer and Francis Neil Wilson, Ipswich, England, assignors to Fisons Horticulture Limited, Felixstowe, England
No Drawing. Filed Jan. 20, 1964, Ser. No. 338,597
Claims priority, application Great Britain, Jan. 23, 1963, 2,807/63, 2,808/63, 2,809/63
5 Claims. (Cl. 71—24)

The present invention relates to a fertilizer composition based on peat and a process for preparing it.

It has been found that by forming compositions comprising peat and water-soluble inorganic salts in given proportions there is obtained a hard, gritty composition in aggregate or granular form having highly desirable characteristics as a fertilizer. These characteristics include a high analysis in plant nutrients such as nitrogen, phosphorus and potassium combined with a large bulk and a low density. These properties enable the fertilizer to be applied uniformly and at accurately controlled rates on the ground. A further characteristic found to be possessed by the peat fertilizer is its low tendency to scorch in comparison to other fertilizers of a similar analysis.

Accordingly the persent invention is for a peat fertilizer composition in granular or aggregate form, said composition containing peat and a water-soluble inorganic salt, the proportion of peat on a dry basis to inorganic salt being in the range 20 to 60% by weight. Preferably in the composition of the persent invention the proportion of peat on a dry basis to inorganic salt is in the range 30 to 50% by weight.

The particulate peat fertilizer composition is obtained according to the present invention by a process which comprises forming a composition comprising peat and fertilizer salts, aggregating or granulating the composition and drying the aggregates or granules, the proportion of peat being in the range 20–60% by weight of the weight of the fertilizer salts on a dry basis. The product of this process is a hard, gritty granular composition in which each granule is of the same make-up and therefore there is not the same tendency for segregation which is found in fertilizers containing peat as a conditioner and obtained by mere admixture of the dry materials.

The proportion of peat to fertilizer salt is substantial and is greater than that commonly employed when dry peat is mixed with a dry fertilizer material merely for the purpose of avoiding caking problems.

The composition comprising peat and fertilizer salts may be formed by adding an aqueous solution or slurry of the salts to the peat in a particulate condition. The solution or slurry may be added in the form of a spray on to the particulate peat while it is being agitated or the peat and the solution, or slurry may be merely mixed or slurried together. The spraying or mixing may be done at ambient or elevated temperatures.

The granular fertilizer composition may also be obtained according to the present invention by a process which comprises treating peat with a mineral acid or an acid salt thereof, neutralising the acid, granulating or aggregating the product and then drying the granules, or aggregates, the proportion of peat being in the range 20–60% by weight of the weight of the fertilizer salts on a dry basis in the fertilizer composition.

The acid or acid salt thereof may be neutralised with ammonia, ammonium hydroxide, ammonium carbonate, caustic potash, caustic soda and the like. The rate of addition of these substances is suitably adjusted so that the temperature does not rise above 70° C. Preferably the rate of addition is adjusted so that the temperature does not rise above 40° C.

The composition comprising peat and fertilizer salts may also contain diluents such as vermiculite, perlite, talc, silica, etc., and organic fertilizer materials such as urea, ureaformaldehyde, bone meal and the like. The composition may further contain herbicidal, fungicidal or pesticidal components and in this respect it is unusual to find that, for example, herbicides still retain their full activity when used in this granular form. Optionally the peat used in the composition of the present invention is an ammoniated peat which may be formed by treating peat with ammonia gas.

Suitably in the process of the present invention the moisture content of the composition is adjusted to 30–55% by weight based on the weight of the composition. Preferably the moisture content of the composition is adjusted to 32–50% by weight based on the weight of the composition. This adjustmtnt of water content, if necessary, may be made before treating or during the treatment of the acidified peat with ammonia, ammonium salts or caustic potash. For instance any additional water which may be necessary may be added along with the acid or with the ammonia.

The chemical treatment according to the present invention is preferably carried out in a paddle-type or planetary mixer such as the Eirich mixer. The product from such a mixer is in granular form and ready for screening and/or drying. Alternatively the chemical treatment of the peat may be performed in a rotary drum which again will yield a granular product. If desired the product from the chemical treatment of the peat may be subject to a separte granulation step, such as for example in a rotary drum.

The drying step of the process of the invention is desirably carried out at a temperature of less than 110° C. and is preferably carried out at a temperature in the range 60–70° C. The drying step may for example be effected on a tray or conveyor belt drier.

It is possible by the process of the present invention to produce granular fertilizers having a size range of 0.5 to 4.0 millimetres and a bulk density of approximately 20–25 lbs./cubic foot. Typical analyses of fertilizers which are produced by the process of the present invention include for example 20:10:5, 20:5:5 and 25:0:0.

The following examples are given to illustrate the present invention.

*Example 1*

Diammonium phosphate (20 parts), sulphate of potash (10 parts), urea (33.7 parts) and peat containing 50% water (62.6 parts) were mixed in a paddle-type mixer. Water was added to induce the formation of granules. The granules were then dried on trays in a current of air at a temperature of 35° C. The dried granules containing 5% moisture were screened and granules of particle size 1.5 to 4.0 millimetres were recovered. The granular peat fertilizer thus obtained had an analysis 20:10:5.

*Example 2*

Wet process phosphoric acid containing 50% $P_2O_5$ (20 parts) was sprayed on to peat containing 50% moisture (56.4 parts) in a rotating drum. After treating with the acid, sulphate of potash 50% $K_2O$ (10 parts) and urea (13 parts) were added to the mixture. This mixture was then ammoniated (4.8 parts ammonia), at such a rate that the temperature did not rise above 40° C. To the neutralised mixture urea formaldehyde (23.8 parts) was added and granulation induced by the addition of water (20 parts). The granules were then dried on conveyor belts passing through an oven the air temperature of which was maintained at 40° C. A product having an analysis 20:10:5 and a particle size in the range 0.5 to 4.0 millimetres was obtained.

Example 3

Sulphuric acid containing 77% $H_2SO_4$ (17.8 parts) was sprayed on to peat containing 50% moisture (55 parts) in a planetary mixer. After treating with acid, urea (18.5 parts) was added to the mixture. This mixture was then ammoniated (4.8 parts) at such a rate that the temperature did not rise above 40° C. To the neutralised mixture was added ureaformaldehyde (30 parts) and granulation induced by the addition of a solution of the sodium salts of 2,4-dichlorophenoxyacetic acid and 2,4,5-trichlorophenoxyacetic acid (1 part) in water (7 parts). The granules were dried in an oven the air temperature of which was 40° C. A granular product was obtained having an analysis 25:0:0.

Example 4

Ammoniated peat was treated with hot urea solution and dried. The finished product contained one part of dried ammoniated peat to one part of urea and was soft and powdery. In contrast peat treated with potassium sulphate and monoammonium phosphate in proportions to give an N, P, K analysis of 22:5:5, the ratio by weight of salts to peat being 1:1, gave a product having a hard gritty feel.

We claim:

1. A process for preparing granular fertilizer materials which comprises forming a composition comprising peat, water and a fertilizer salt selected from the group consisting of ammonium sulphate, monoammonium phosphate, diammonium phosphate, potassium phosphate, monocalcium phosphate, potassium chloride and potassium sulphate, agitating the said composition to form granules, drying the granules at a temperature of less than 110° C. in the absence of substantial movement between the granules and recovering the dried granules, the water content of the composition which is agitated being in the range 30–55% by weight based on the weight of the composition and the proportion of peat being in the range 20–60% by weight based on the weight of the fertilizer salt on a dry basis.

2. A process for preparing granular fertilizer materials which comprises forming a composition comprising peat, water and a fertilizer salt selected from the group consisting of ammonium sulphate, monoammonium phosphate, diammonium phosphate, potassium phosphate, monocalcium phosphate, potassium chloride and potassium sulphate, agitating the said composition to form granules, drying the granules at a temperature of less than 110° C. in the absence of substantial movement between the granules and recovering the dried granules, the water content of the composition which is agitated being in the range 32–50% by weight based on the weight of the composition and the proportion of peat being in the range 30–50% by weight based on the weight of the fertilizer salt on a dry basis.

3. A process for preparing granular fertilizer materials which comprises adding a mixture containing water and a fertilizer salt to peat, agitating the resulting composition to form granules, drying the granules at a temperature of less than 110° C. in the absence of substantial movement between the granules and recovering the dried granules, the fertilizer salt being selected from the group consisting of ammonium sulphate, monoammonium phosphate, diammonium phosphate, potassium phosphate, monocalcium phosphate, potassium chloride and potassium sulphate, the water content of the composition which is agitated being in the range 32–50% by weight based on the weight of the composition and the proportion of peat being in the range 30–50% by weight based on the weight of the fertilizer salt on a dry basis.

4. A process for preparing granular fertilizer materials which comprises treating peat with an acid selected from the group consisting of phosphoric acid and sulphuric acid, ammoniating the resultant mixture to form ammonium salts of said acid, while maintaining the temperature below 50° C., agitating the resulting composition to form granules, drying the granules at a temperature of less than 110° C. in the absence of substantial movement between the granules and recovering the dried granules, the water content of the composition which is agitated being in the range 32–50% by weight based on the weight of the composition and the proportion of peat being in the range 30–50% by weight based on the weight of the fertilizer salt on a dry basis.

5. A process for preparing granular fertilizer materials which comprises forming a composition comprising peat, water and a fertilizer salt selected from the group consisting of ammonium sulphate, monoammonium phosphate, diammonium phosphate, potassium phosphate, monocalcium phosphate, potassium chloride and potassium sulphate, agitating the composition to form granules, drying the granules at a temperature in the range 60–70° C. in the absence of substantial movement between the granules and recovering the dried granules, the water content of the composition which is agitated being in the range 32–50% by weight based on the weight of the composition and the proportion of peat being in the range 30–50% by weight based on the weight of the fertilizer salt on a dry basis.

References Cited by the Examiner

UNITED STATES PATENTS

| | | | |
|---|---|---|---|
| 847,749 | 3/1907 | Ellis | 71—24 |
| 1,252,332 | 1/1918 | Earp-Thomas | 71—24 |
| 1,254,366 | 1/1918 | Schroeder | 71—24 |
| 1,320,701 | 11/1919 | Manns | 71—24 |
| 1,858,230 | 5/1932 | Walton et al. | 71—24 |
| 1,930,542 | 10/1933 | Smith | 71—24 |
| 2,097,457 | 11/1937 | Grether | 71—23 |

DONALL H. SYLVESTER, *Primary Examiner.*

ANTHONY SCIAMANNA, T. D. KILEY,
*Assistant Examiners.*